(12) United States Patent
Fomani et al.

(10) Patent No.: US 11,475,692 B2
(45) Date of Patent: *Oct. 18, 2022

(54) OPTICAL SENSOR FOR INTEGRATION OVER A DISPLAY BACKPLANE

(71) Applicant: FINGERPRINT CARDS AB, Gothenburg (SE)

(72) Inventors: Arash Akhavan Fomani, Saratoga, CA (US); Marek Mienko, San Jose, CA (US); Patrick Smith, San Jose, CA (US); Paul Wickboldt, Walnut Creek, CA (US)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 877 days.

This patent is subject to a terminal disclaimer.

(21) Appl. No.: 16/199,718

(22) Filed: Nov. 26, 2018

(65) Prior Publication Data
US 2019/0095676 A1 Mar. 28, 2019

Related U.S. Application Data

(63) Continuation of application No. 15/087,971, filed on Mar. 31, 2016, now Pat. No. 10,169,630.
(Continued)

(51) Int. Cl.
*G06F 3/042* (2006.01)
*G06V 40/13* (2022.01)
(Continued)

(52) U.S. Cl.
CPC ............ *G06V 40/13* (2022.01); *G01J 1/0214* (2013.01); *G01J 1/0233* (2013.01); *G01J 1/04* (2013.01);
(Continued)

(58) Field of Classification Search
CPC ............ G06K 9/00013; G06K 9/0004; G06K 9/0008; G06K 2009/0006; G01J 1/0214;
(Continued)

(56) References Cited

U.S. PATENT DOCUMENTS

| | | |
|---|---|---|
| 5,726,443 A | 3/1998 | Immega et al. |
| 5,991,467 A | 11/1999 | Kamiko |

(Continued)

FOREIGN PATENT DOCUMENTS

| | | |
|---|---|---|
| CN | 1900949 A | 1/2007 |
| CN | 101738775 A | 6/2010 |

(Continued)

OTHER PUBLICATIONS

Rowe et al. "Multispectral Fingerprint Image Acquisition" Springer, New York, USA, 2008 pp. 3-23.
(Continued)

*Primary Examiner* — Abdul-Samad A Adediran
(74) *Attorney, Agent, or Firm* — RMCK Law Group, PLC

(57) ABSTRACT

Systems and methods for optical imaging are disclosed. An optical sensor for imaging a biometric input object on a sensing region includes a transparent layer having a first side and a second side opposite the first side; a set of apertures disposed above the first side of the transparent layer; a first set of reflective surfaces disposed below the second side of the transparent layer configured to receive light transmitted through the first set of apertures and to reflect the received light; a second set of reflective surfaces disposed above the first side of the transparent layer configured to receive the light reflected from the first set of reflective surfaces and to further reflect the light; and a plurality of detector elements positioned to receive the further reflected light from the second set of reflective surfaces.

20 Claims, 9 Drawing Sheets

Related U.S. Application Data

(60) Provisional application No. 62/262,863, filed on Dec. 3, 2015.

(51) Int. Cl.

| | |
|---|---|
| *G01J 1/04* | (2006.01) |
| *G01J 1/02* | (2006.01) |
| *G01J 1/06* | (2006.01) |
| *G01J 1/08* | (2006.01) |
| *G06V 40/12* | (2022.01) |
| *G02F 1/1333* | (2006.01) |
| *G02F 1/1335* | (2006.01) |
| *G02F 1/133* | (2006.01) |
| *G02F 1/1368* | (2006.01) |

(52) U.S. Cl.
CPC ........... *G01J 1/0407* (2013.01); *G01J 1/0411* (2013.01); *G01J 1/0414* (2013.01); *G01J 1/0422* (2013.01); *G01J 1/0429* (2013.01); *G01J 1/0437* (2013.01); *G01J 1/0488* (2013.01); *G01J 1/0492* (2013.01); *G01J 1/06* (2013.01); *G01J 1/08* (2013.01); *G02F 1/13338* (2013.01); *G02F 1/133512* (2013.01); *G06F 3/0428* (2013.01); *G06V 40/1318* (2022.01); *G06V 40/1359* (2022.01); *G02F 1/1368* (2013.01); *G02F 1/13318* (2013.01); *G02F 1/133514* (2013.01); *G02F 1/133528* (2013.01); *G02F 1/133536* (2013.01); *G06V 40/1341* (2022.01)

(58) Field of Classification Search
CPC .......... G01J 1/0233; G01J 1/04; G01J 1/0407; G01J 1/0411; G01J 1/0414; G01J 1/0422; G01J 1/0429; G01J 1/0437; G01J 1/0488; G01J 1/0492; G01J 1/06; G01J 1/08; G02F 1/13338; G02F 1/133512; G02F 1/13318; G02F 1/133514; G02F 1/133528; G02F 1/133536; G02F 1/1368; G06F 3/0428; H04N 7/144; G06V 40/13; G06V 40/1318; G06V 40/1359; G06V 40/1341
USPC ....................... 348/333.01; 382/124
See application file for complete search history.

(56) References Cited

U.S. PATENT DOCUMENTS

| | | | |
|---|---|---|---|
| 6,128,399 A | 10/2000 | Calmel | |
| 7,212,279 B1 | 5/2007 | Feng | |
| 7,465,914 B2 | 12/2008 | Eliasson et al. | |
| 7,535,468 B2 | 5/2009 | Uy | |
| 7,728,959 B2 | 6/2010 | Waldman et al. | |
| 7,969,422 B2 | 6/2011 | Gruhlke | |
| 8,204,283 B2 | 6/2012 | Wu | |
| 8,204,284 B2 | 6/2012 | Wu | |
| 8,259,168 B2 | 9/2012 | Wu et al. | |
| 8,391,569 B2 | 3/2013 | Wu | |
| 8,487,913 B2 | 7/2013 | Tsuda | |
| 8,520,912 B2 | 8/2013 | Wu et al. | |
| 8,570,303 B2 | 10/2013 | Chen | |
| 8,649,001 B2 | 2/2014 | Wu et al. | |
| 8,798,337 B2 | 8/2014 | Lei et al. | |
| 8,903,140 B2 | 12/2014 | Wu | |
| 8,917,387 B1 | 12/2014 | Lee et al. | |
| 8,921,473 B1 | 12/2014 | Hyman | |
| 9,177,190 B1 | 11/2015 | Chou et al. | |
| 9,208,394 B2 | 12/2015 | Di Venuto Dayer et al. | |
| 9,829,614 B2 | 11/2017 | Smith et al. | |
| 9,934,418 B2 | 4/2018 | Mienko et al. | |
| 2001/0050765 A1 | 12/2001 | Antonelli et al. | |
| 2004/0208346 A1 | 10/2004 | Baharav et al. | |
| 2004/0252867 A1 | 12/2004 | Lan et al. | |
| 2005/0036665 A1 | 2/2005 | Higuchi | |
| 2005/0157914 A1 | 7/2005 | Kim et al. | |
| 2005/0243055 A1 | 11/2005 | Ranta et al. | |
| 2007/0222998 A1 | 9/2007 | Sasaki et al. | |
| 2008/0025579 A1 | 1/2008 | Sidlauskas et al. | |
| 2008/0121442 A1 | 5/2008 | Boer et al. | |
| 2008/0122803 A1 | 5/2008 | Izadi et al. | |
| 2008/0165267 A1* | 7/2008 | Cok | H04N 7/144 |
| | | | 348/333.01 |
| 2008/0239285 A1 | 10/2008 | Wang et al. | |
| 2010/0067757 A1 | 3/2010 | Arai et al. | |
| 2010/0172552 A1 | 7/2010 | Wu | |
| 2010/0183200 A1 | 7/2010 | Wu | |
| 2010/0208952 A1 | 8/2010 | Wu | |
| 2010/0208954 A1 | 8/2010 | Wu | |
| 2010/0283756 A1 | 11/2010 | Ku et al. | |
| 2010/0309169 A1 | 12/2010 | Lieberman et al. | |
| 2011/0122071 A1 | 5/2011 | Powell | |
| 2011/0233383 A1 | 9/2011 | Oku | |
| 2011/0254809 A1 | 10/2011 | Yu et al. | |
| 2011/0298753 A1 | 12/2011 | Chuang et al. | |
| 2012/0026093 A1 | 2/2012 | Duparre et al. | |
| 2012/0076370 A1 | 3/2012 | Lei et al. | |
| 2012/0054350 A1 | 4/2012 | Ganapathi et al. | |
| 2012/0086672 A1 | 4/2012 | Tseng et al. | |
| 2012/0105614 A1 | 5/2012 | Wu et al. | |
| 2012/0133624 A1 | 5/2012 | Castagner et al. | |
| 2012/0241825 A1 | 9/2012 | Ajshi | |
| 2012/0295665 A1 | 11/2012 | Pantfoerder | |
| 2012/0321149 A1 | 12/2012 | Carver et al. | |
| 2012/0328170 A1 | 12/2012 | Wu et al. | |
| 2013/0034274 A1 | 2/2013 | Wu et al. | |
| 2013/0051635 A1 | 2/2013 | Wu et al. | |
| 2013/0119237 A1 | 5/2013 | Raguin et al. | |
| 2013/0120760 A1 | 5/2013 | Rajuin et al. | |
| 2013/0169780 A1 | 7/2013 | Wu | |
| 2013/0222282 A1 | 8/2013 | Huang et al. | |
| 2014/0043527 A1 | 2/2014 | Lu | |
| 2014/0125788 A1 | 5/2014 | Wu | |
| 2014/0268138 A1 | 9/2014 | Yokino et al. | |
| 2014/0354596 A1 | 12/2014 | Djordjev et al. | |
| 2014/0355846 A1 | 12/2014 | Lee et al. | |
| 2015/0035799 A1 | 2/2015 | Lin et al. | |
| 2015/0036065 A1 | 2/2015 | Yousefpor et al. | |
| 2015/0062088 A1 | 3/2015 | Cho et al. | |
| 2015/0078633 A1 | 3/2015 | Hung | |
| 2015/0084994 A1 | 3/2015 | Wyrwas et al. | |
| 2015/0242056 A1 | 8/2015 | Hoffman | |
| 2015/0331508 A1 | 11/2015 | Nho et al. | |
| 2015/0347812 A1 | 12/2015 | Lin | |
| 2015/0369661 A1 | 12/2015 | Lin | |
| 2015/0371074 A1 | 12/2015 | Lin | |
| 2015/0371075 A1 | 12/2015 | Lin | |
| 2016/0110025 A1* | 4/2016 | Hossu | G06K 9/00013 |
| | | | 382/124 |
| 2016/0224144 A1* | 8/2016 | Klinghult | G06F 3/0428 |
| 2017/0017824 A1 | 1/2017 | Smith et al. | |
| 2017/0161544 A1 | 6/2017 | Fomani et al. | |
| 2017/0220838 A1 | 8/2017 | He et al. | |

FOREIGN PATENT DOCUMENTS

| | | |
|---|---|---|
| CN | 101814125 A | 8/2010 |
| CN | 101814126 B | 8/2010 |
| CN | 102467660 A | 5/2012 |
| CN | 102682280 A | 9/2012 |
| CN | 202443032 U | 9/2012 |
| CN | 102842026 A | 12/2012 |
| CN | 202632318 U | 12/2012 |
| CN | 102915430 A | 2/2013 |
| CN | 102955936 A | 3/2013 |
| CN | 101814126 A | 4/2013 |
| CN | 102682280 B | 6/2013 |
| CN | 103168283 A | 6/2013 |
| CN | 103198289 A | 7/2013 |
| CN | 102467660 B | 11/2013 |
| CN | 103703349 B | 4/2014 |

(56) References Cited

FOREIGN PATENT DOCUMENTS

| | | |
|---|---|---|
| CN | 103810483 A | 5/2014 |
| CN | 103942537 A | 7/2014 |
| CN | 104035620 A | 9/2014 |
| CN | 104063704 A | 9/2014 |
| CN | 203838722 U | 9/2014 |
| CN | 104182727 A | 12/2014 |
| CN | 204028936 U | 12/2014 |
| CN | 104463074 A | 3/2015 |
| CN | 102915430 B | 8/2015 |
| CN | 102842026 B | 9/2015 |
| CN | 102955936 B | 9/2015 |
| CN | 105093913 A | 11/2015 |
| EP | 2437201 A2 | 4/2012 |
| EP | 2437201 A3 | 4/2012 |
| EP | 2447883 A1 | 5/2012 |
| EP | 2555137 A1 | 2/2013 |
| EP | 2562683 A1 | 2/2013 |
| JP | 2009-163408 A1 | 10/2009 |
| JP | 3177550 U | 8/2012 |
| KR | 1020040034776 A | 4/2004 |
| KR | 20120003165 U | 5/2012 |
| KR | 200462271 Y1 | 9/2012 |
| KR | 20130016023 A | 2/2013 |
| KR | 20130022364 A | 3/2013 |
| KR | 101259310 B1 | 5/2013 |
| KR | 101307002 B1 | 9/2013 |
| TW | 201214303 A1 | 4/2010 |
| TW | 201027436 A1 | 7/2010 |
| TW | 201032145 A1 | 9/2010 |
| TW | 201115479 A1 | 5/2011 |
| TW | M435680 U1 | 2/2012 |
| TW | 1382349 B1 | 1/2013 |
| TW | 1382350 B1 | 1/2013 |
| TW | 201301144 A1 | 1/2013 |
| TW | 1450201 B | 2/2013 |
| TW | 201310353 A1 | 3/2013 |
| TW | 201329872 A1 | 7/2013 |
| TW | 201419165 A | 5/2014 |
| TW | 1444904 B | 7/2014 |
| TW | 1448973 B | 8/2014 |
| TW | 1457842 B | 10/2014 |
| TW | 201441940 A | 11/2014 |
| TW | 1456510 B | 12/2014 |
| TW | 201308215 A1 | 2/2015 |
| TW | 201506807 A | 2/2015 |
| WO | WO 2015/041459 A1 | 3/2015 |
| WO | WO 2015/140600 A1 | 9/2015 |
| WO | WO 2016/119492 A1 | 8/2016 |

OTHER PUBLICATIONS

VKANSEE Presentation prior to Sep. 30, 2015.
Cho, et al., "Embedded Nano-Si Optical Sensor in TFT-LCDs Technology and Integrated as Touch-Input Display".
Brown, et al., "A Continuous-Grain Silicon-System LCD With Optical Input Function".
International Search Report and Written Opinion in PCT/US2016/064174 dated Feb. 13, 2017.
International Search Report and Written Opinion in PCT/US2016/064148 dated Feb. 14, 2017.
International Search Report and Written Opinion in PCT/US2016/064103 dated Feb. 13, 2017.
First Office Action dated Jan. 3, 2020 in Chinese Patent Application No. 201680070572.4, filed Nov. 30, 2016.
Office Action dated Mar. 2, 2020 in Chinese Patent Application No. 201680070573.9, filed Nov. 30, 2016.
U.S. Appl. No. 15/087,971, filed Mar. 31, 2016.

* cited by examiner

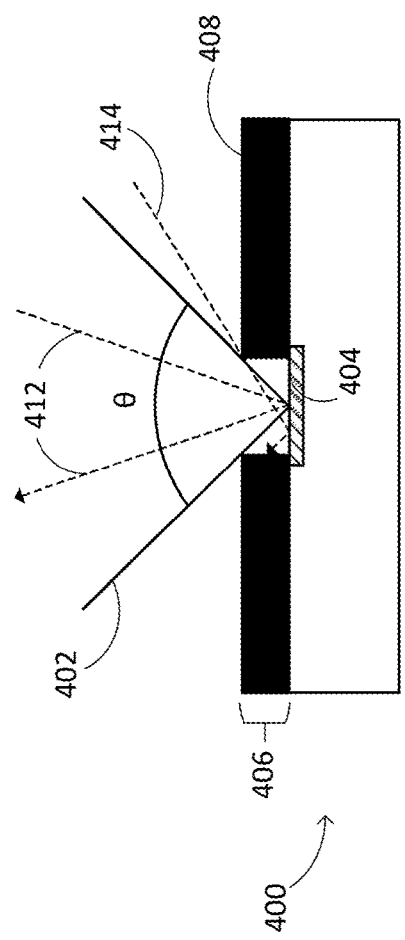
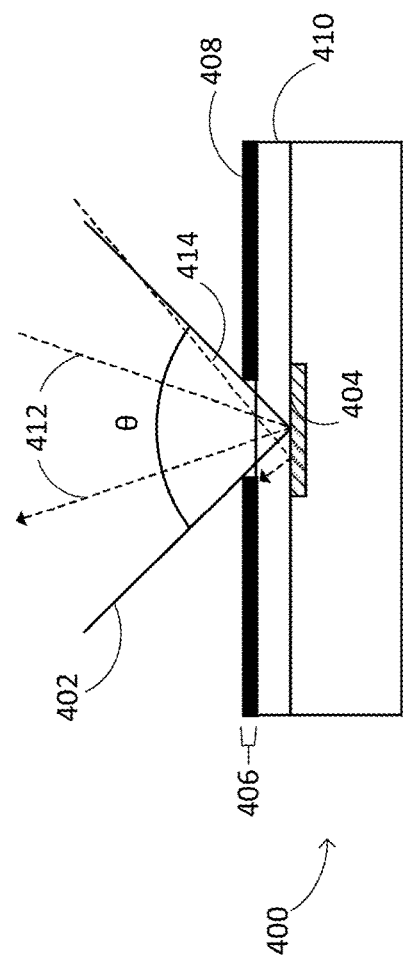

OPTICAL SENSOR FOR INTEGRATION OVER A DISPLAY BACKPLANE

CROSS REFERENCE TO RELATED APPLICATIONS

This application is a continuation of U.S. Non-Provisional patent application Ser. No. 15/087,971 entitled "Optical Sensor for Integration Over A Display Backplane," filed Mar. 31, 2016; which claims the benefit of U.S. Provisional Patent Application Ser. No. 62/262,863 entitled "Display Integrated Optical Fingerprint Sensor with Transparent Layer," filed Dec. 3, 2015, the entire contents of which are both expressly incorporated by reference.

This application is further related to U.S. patent application Ser. No. 15/087,955, entitled "Optical Sensor for Integration in a Display" and U.S. patent application Ser. No. 15/087,785, entitled "Display Integrated Optical Fingerprint Sensor with Angle Limiting Reflector," both filed on Mar. 31, 2016, the entire contents of which are expressly incorporated by reference.

FIELD

This disclosure generally relates to optical sensors, and more particularly to an optical sensor which may be integrated into a display stack.

BACKGROUND

Object imaging is useful in a variety of applications. By way of example, biometric recognition systems image biometric objects for authenticating and/or verifying users of devices incorporating the recognition systems. Biometric imaging provides a reliable, non-intrusive way to verify individual identity for recognition purposes. Various types of sensors may be used for biometric imaging.

Fingerprints, like various other biometric characteristics, are based on distinctive personal characteristics and thus provide a reliable mechanism to recognize an individual. Thus, fingerprint sensors have many potential applications. For example, fingerprint sensors may be used to provide access control in stationary applications, such as security checkpoints. Fingerprint sensors may also be used to provide access control in mobile devices, such as cell phones, wearable smart devices (e.g., smart watches and activity trackers), tablet computers, personal data assistants (PDAs), navigation devices, and portable gaming devices. Accordingly, some applications, in particular applications related to mobile devices, may require recognition systems that are both small in size and highly reliable.

Most commercially available fingerprint sensors are based on optical or capacitive sensing technologies. Most mobile devices have capacitive sensors with a sensing array configured to sense ridge and valley features of a fingerprint. Typically, these fingerprint sensors either detect absolute capacitance (sometimes known as "self-capacitance") or trans-capacitance (sometimes known as "mutual capacitance"). In either case, capacitance at each sensing element in the array varies depending on whether a ridge or valley is present, and these variations are electrically detected to form an image of the fingerprint.

While capacitive fingerprint sensors provide certain advantages, most commercially available capacitive fingerprint sensors have difficulty sensing fine ridge and valley features through large distances, requiring the fingerprint to contact a sensing surface that is close to the sensing array.

It remains a significant challenge for a capacitive sensor to detect fingerprints through thick layers, such as the thick cover glass (sometimes referred to herein as a "cover lens") that protects the display of many smart phones and other mobile devices. To address this issue, a cutout is often formed in the cover glass in an area beside the display, and a discrete capacitive fingerprint sensor (often integrated with a mechanical button) is placed in the cutout area so that it can detect fingerprints without having to sense through the cover glass. The need for a cutout makes it difficult to form a flush surface on the face of device, detracting from the user experience, and complicating the manufacture. The hole in the device enclosure also can allow moisture or contaminants to enter the device. The existence of mechanical buttons also takes up valuable device real estate.

Solutions using optical fingerprint sensors usually require an optical element to condition light before the light reaches the sensor elements. Conventional optical elements often cannot fit within the limited height available in relatively small spaces, such as found in a display stack of an electronic device.

SUMMARY

One embodiment of the disclosure provides an optical sensor for imaging a biometric input object on a sensing region. The optical sensor includes a transparent layer having a first side and a second side opposite the first side; a set of apertures disposed above the first side of the transparent layer; a first set of reflective surfaces disposed below the second side of the transparent layer configured to receive light transmitted through the first set of apertures and to reflect the received light; a second set of reflective surfaces disposed above the first side of the transparent layer configured to receive the light reflected from the first set of reflective surfaces and to further reflect the light; and a plurality of detector elements positioned to receive the further reflected light from the second set of reflective surfaces.

Another embodiment of the invention provides a display including a sensor for imaging a biometric input object. The display includes a set of display pixels; a first light blocking layer having a set of apertures and a first set of mirrors; a transparent layer positioned below the first light blocking layer; a reflective layer positioned below the transparent layer configured to receive light transmitted through the set of apertures and to reflect the received light towards the first set of mirrors, the first set of mirrors being configured to further reflect the reflected light from the reflective layer; and a set of detector elements positioned below the transparent layer and configured to detect the further reflected light from the first set of mirrors.

Another embodiment of the invention provides a method for making an optical fingerprint sensor. The method includes forming a set of detector elements and a first set of mirrored surfaces above a substrate; forming a transparent layer above the set of detector elements and the first set of mirrored surfaces; and forming a light blocking layer above the transparent layer, the light blocking layer having a set of apertures and a second set of mirrored surfaces.

BRIEF DESCRIPTION OF THE DRAWINGS

FIGS. 4A-4C illustrate examples of reflective layers according to different embodiments.

DETAILED DESCRIPTION

The following detailed description is exemplary in nature and is not intended to limit the disclosure or the application and uses of the disclosure. Furthermore, there is no intention to be bound by any expressed or implied theory presented in the preceding field, background, summary, brief description of the drawings, or the following detailed description.

Turning to the drawings, and as described in greater detail herein, embodiments of the disclosure provide systems and methods to optically image an input object such as a fingerprint. In particular, a system and method are described wherein an optical sensor includes one or more reflective surfaces and apertures to restrict the angle of light reaching detector elements such that the light reaching each detector element corresponds to a relatively small area on the object being imaged. The combination of apertures and reflective surfaces act as a folded collimator minimizing the thickness of the detector in a display. This allows the disclosed embodiments to avoid having to make trade-offs between cover layer thickness, image blurring, and display image quality.

Figure 1:
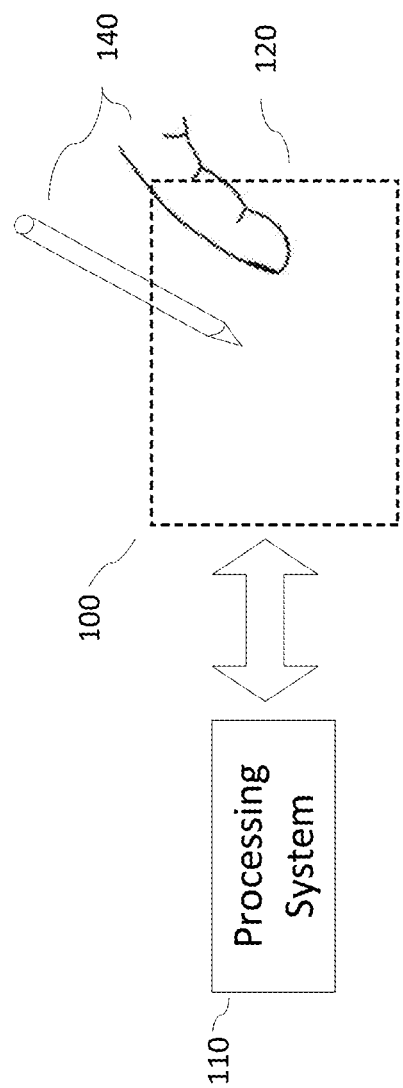
FIG. 1 is a block diagram of an example of a sensing system.

FIG. 1 is a block diagram of an exemplary sensing system having a sensor 100, in accordance with embodiments of the disclosure. The sensor 100 may be configured to provide input to an electronic system (also "electronic device"). Some non-limiting examples of electronic systems include personal computers of all sizes and shapes, such as desktop computers, laptop computers, netbook computers, tablets, e-book readers, personal digital assistants (PDAs), and wearable computers (such as smart watches and activity tracker devices). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The sensor 100 can be implemented as a physical part of the electronic system, or can be physically separate from the electronic system. In accordance with the disclosure, the sensor 100 may be integrated as part of a display of an electronic device. As appropriate, the sensor 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

The sensor 100 is configured to sense input provided by one or more input objects 140 in a sensing region 120. In one embodiment, the input object 140 is a finger, and the sensor 100 is implemented as a fingerprint sensor (also "fingerprint scanner") configured to detect fingerprint features of the input object 140. In other embodiments, the sensor 100 may be implemented as vascular sensor (e.g., for finger vein recognition), hand geometry sensor, or a proximity sensor (such as a touch pad, touch screen, and or other touch sensor device).

Sensing region 120 encompasses any space above, around, in, and/or near the sensor 100 in which the sensor 100 is able to detect input (e.g., user input provided by one or more input objects 140). The sizes, shapes, and locations of particular sensing regions may vary widely from embodiment to embodiment. In some embodiments, the sensing region 120 extends from a surface of the sensor 100 in one or more directions into space. In various embodiments, input surfaces may be provided by surfaces of casings within which sensor elements reside, by face sheets applied over the sensor elements or any casings, etc. In some embodiments, the sensing region 120 has a rectangular shape when projected onto an input surface of the input device 100.

The sensor 100 may utilize any combination of sensor components and sensing technologies to detect user input in the sensing region 120. The sensor 100 comprises one or more detector elements (or "sensing elements") for detecting user input. Some implementations utilize arrays or other regular or irregular patterns of sensing elements to detect the input object 140.

In the optical implementations of the input device 100 set forth in this disclosure, one or more detector elements detect light from the sensing region. In various embodiments, the detected light may be reflected from input objects in the sensing region, emitted by input objects in the sensing region, or some combination thereof. Example optical detector elements include photodiodes, CMOS arrays, CCD arrays, photodiodes, and other types of photosensors configured to detect light in the visible or invisible spectrum (such as infrared or ultraviolet light). The photosensors may be thin film photodetectors, such as thin film transistors (TFTs) or thin film diodes.

Some optical implementations provide illumination to the sensing region. Reflections from the sensing region in the illumination wavelength(s) are detected to determine input information corresponding to the input object.

Some optical implementations rely on principles of direct illumination of the input object, which may or may not be in contact with an input surface of the sensing region depending on the configuration. One or more light sources and/or light guiding structures may be used to direct light to the sensing region. When an input object is present, this light is reflected from surfaces of the input object, which reflections can be detect by the optical sensing elements and used to determine information about the input object.

Some optical implementations rely on principles of internal reflection to detect input objects in contact with the input surface of the sensing region. One or more light sources may be used to direct light in a transmitting medium at an angle at which it is internally reflected at the input surface of the sensing region, due to different refractive indices at opposing sides of the boundary defined by the sensing surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object. In such embodiments, the light may be directed to the input surface at an angle of incidence at which it is totally internally reflected, except where the input object is in contact with the input surface and causes the light to partially transmit across this interface. An example of this is the presence of a finger introduced to an input surface defined by a glass to air interface. The higher refractive index of human skin compared to air causes light incident at the input surface at the critical angle of the interface to air to be partially transmitted through the finger, where it would otherwise be totally internally reflected at the glass to air interface. This optical response can be detected by the system and used to determine spatial information. In some embodiments, this can be used to image small scale fingerprint features, where the internal reflectivity of the incident light differs depending on whether a ridge or valley is in contact with that portion of the input surface.

Some implementations are configured to provide images that span one, two, three, or higher dimensional spaces. The input device may have a sensor resolution that varies from embodiment to embodiment depending on factors such as the particular sensing technology involved and/or the scale of information of interest. For example, some biometric sensing implementations may be configured to detect physiological features of the input object (such as fingerprint ridge features of a finger, or blood vessel patterns of an eye), which may utilize higher sensor resolutions and present different technical considerations from some proximity sensor implementations that are configured to detect a position of the input object with respect to the sensing region (such as a touch position of a finger with respect to an input surface). In some embodiments, the sensor resolution is determined by the physical arrangement of an array of sensing elements, where smaller sensing elements and/or a smaller pitch can be used to define a higher sensor resolution.

In some embodiments, the sensor 100 is implemented as a fingerprint sensor having a sensor resolution high enough to capture features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 750 pixels per inch (ppi) is capable of reliably capturing these higher level features.

In some embodiments, the fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture to a fingerprint input based on relative movement between the user's finger and the sensing region. Typically, the swipe sensor includes a linear array or a thin two-dimensional array of sensing elements configured to capture multiple frames as the user's finger is swiped over the sensing region. The multiple frames may then be reconstructed to form an image of the fingerprint corresponding to the fingerprint input. In some implementations, the sensor is configured to capture both placement and swipe inputs.

In some embodiments, the fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some example imaging areas for partial placement sensors include an imaging area of 100 $mm^2$ or less. In another exemplary embodiment, a partial placement sensor has an imaging area in the range of 20-50 $mm^2$. In some implementations, the partial fingerprint sensor has an input surface that is the same size as the imaging area.

While the input device is generally described in the context of a fingerprint sensor in FIG. 1, embodiments of the present disclosure include other biometric sensor devices. In various embodiments, a biometric sensor device may be configured to capture physiological biometric characteristics of a user. Some example physiological biometric characteristics include fingerprint patterns, vascular patterns (sometimes known as "vein patterns"), palm prints, and hand geometry.

In FIG. 1, a processing system 110 is shown in communication with the input device 100. The processing system 110 comprises parts of or all of one or more integrated circuits (ICs) and/or other circuitry components. In some embodiments, the processing system may be configured to operate hardware of the input device to capture input data, and/or implement a biometric process or other process based on input data captured by the sensor 100.

In some implementations, the processing system 110 is configured to operate sensor hardware of the sensor 100 to detect input in the sensing region 120. In some implementations, the processing system comprises driver circuitry configured to drive signals with sensing hardware of the input device and/or receiver circuitry configured to receive signals with the sensing hardware.

For example, a processing system for an optical sensor device may comprise driver circuitry configured to drive illumination signals to one or more LEDs, an LCD backlight or other light sources, and/or receiver circuitry configured to receive signals with optical receiving elements.

In some embodiments, the processing system 110 comprises electronically-readable instructions, such as firmware code, software code, and/or the like. In some embodiments, the processing system 110 includes memory for storing electronically-readable instructions and/or other data, such as reference templates for biometric recognition. The processing system 110 can be implemented as a physical part of the sensor 100, or can be physically separate from the sensor 100. The processing system 110 may communicate with parts of the sensor 100 using buses, networks, and/or other wired or wireless interconnections. In some embodiments, components composing the processing system 110 are located together, such as near sensing element(s) of the sensor 100. In other embodiments, components of processing system 110 are physically separate with one or more components close to sensing element(s) of sensor 100, and one or more components elsewhere. For example, the sensor 100 may be a peripheral coupled to a computing device, and the processing system 110 may comprise software configured to run on a central processing unit of the computing device and one or more ICs (perhaps with associated firmware) separate from the central processing unit. As another example, the sensor 100 may be physically integrated in a mobile device, and the processing system 110 may comprise circuits and/or firmware that are part of a central processing unit or other main processor of the mobile device. In some embodiments, the processing system 110 is dedicated to implementing the sensor 100. In other embodiments, the processing system 110 performs functions associated with the sensor and also performs other functions, such as operating display screens, driving haptic actuators, running an operating system (OS) for the electronic system, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In one or more embodiments, a first and second module may be comprised in separate integrated circuits. For example, a first module may be comprised at least partially within a first integrated circuit and a separate module may be comprised at least partially within a second integrated circuit. Further, portions of a single module may span multiple integrated circuits.

In some embodiments, the processing system 110 responds to user input (or lack of user input) in the sensing region 120 directly by causing one or more actions. Example actions include unlocking a device or otherwise changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the sensor 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, authenticate a user, and the like.

In some embodiments, the sensing region 120 of the sensor 100 overlaps at least part of an active area of a display screen, such as embodiments where the sensor 100 comprises a touch screen interface and/or biometric sensing embodiments configured to detect biometric input data over the active display area. For example, the sensor 100 may comprise substantially transparent sensor electrodes. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The display screen may also be flexible or rigid, and may be flat, curved, or have other geometries. In some embodiments, the display screen includes a glass or plastic substrate for TFT circuitry and/or other circuitry, which may be used to provide visuals and/or provide other functionality. In some embodiments, the display device includes a cover lens (sometimes referred to as a "cover glass") disposed above display circuitry which may also provide an input surface for the input device. Example cover lens materials include optically clear amorphous solids, such as chemically hardened glass, as well as optically clear crystalline structures, such as sapphire. In accordance with the disclosure, the sensor 100 and the display screen may share physical elements. For example, some embodiments may utilize some of the same electrical components for displaying visuals and for input sensing. In one embodiment, one or more display electrodes of a display device may configured for both display updating and input sensing. As another example, the display screen may be operated in part or in total by the processing system 110 in communication with the input device.

Figure 2A:
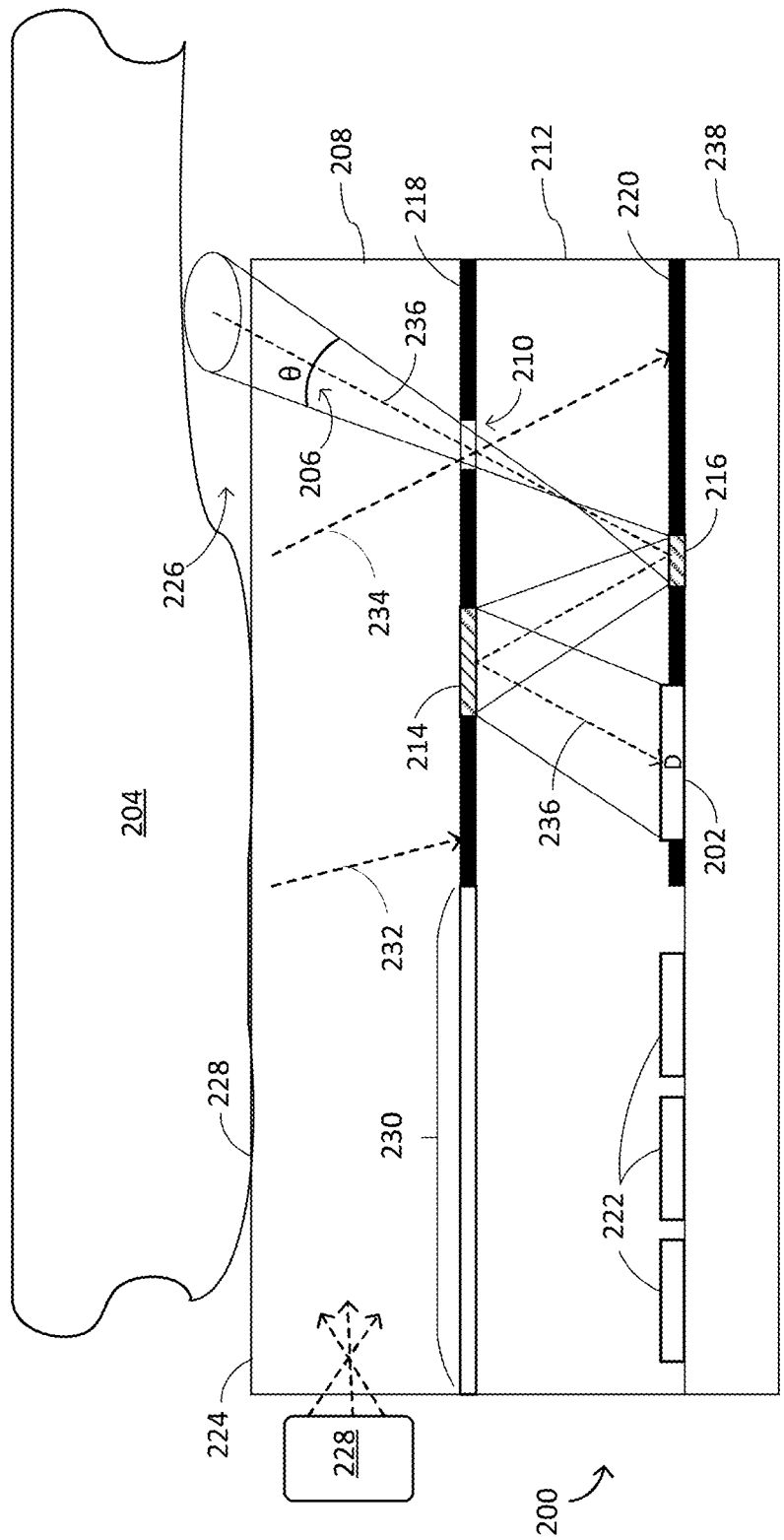
FIG. 2A-2C illustrate examples of a sensor integrated in a display for imaging an input object, according to different embodiments.

FIG. 2A illustrates an example of an optical sensor device 200, which may be integrated in a display. The embodiment uses photo-sensor detector elements 202 to sense an image of an input object 204 (e.g., fingerprint) placed on or near cover glass or cover lens of the display. To reduce blurring and achieve a clear image, an optical path is formed that enables sensing of light transmitted to the top side of detector element 202 (same side of an input object to be imaged), as shown. The optical path is represented by an acceptance cone 206 having an acceptance angle θ and includes a transmission path through a cover layer 208, defined apertures 210, through a transparent layer 212, first reflected off reflective surfaces 216, second reflected off reflected surfaces 214 before reaching the detector elements 202. These features limit the optical path to the acceptance cone of light 206 with a small acceptance angle. Also shown are blocking layer 218, which may occlude light in areas not occupied by the apertures 210, and reflective layer 220, which may absorb light in areas not occupied by reflective surfaces 216. Maintaining a small acceptance angle, and thus minimizing blurring, is realized by the disclosed embodiments. The sensor 200 also includes various display pixels or sub-pixels 222, which may present varying colors and are used to output an electronic graphical display visible to a user.

A cover layer 208 is provided as part of the display to protect inner components of the display such as the detector elements 202 and the display pixels or sub-pixels 222. A top surface 224 of the cover layer 208 forms a sensing surface, which provides a contact area for the input object 204. It will be understood that the sensing surface 224 forms part of a sensing region in which an object may be imaged. As previously described, the sensing region may extend above the actual sensing surface 224. For simplicity, the cover layer 208 is shown as a single layer. However, the cover layer may include multiple cover layers or lenses, and may also include additional components such polarizers, color filters and the like, which vary depending on the type of display technology utilized.

Although generally described in the context of a fingerprint for illustrative purposes, the input object 204 is any object to be imaged. Generally, the object 204 will have various features. By way of example, the object 204 has ridges 228 and valleys 226. Due to their protruding nature, the ridges 228 contact the sensing surface 224. The valleys 226 may not contact the sensing surface 224 and instead form an air gap between the input object 204 and the sensing surface 224. These features may be optically imaged using direct illumination or by relying on principles of internal reflection.

Figure 2B:
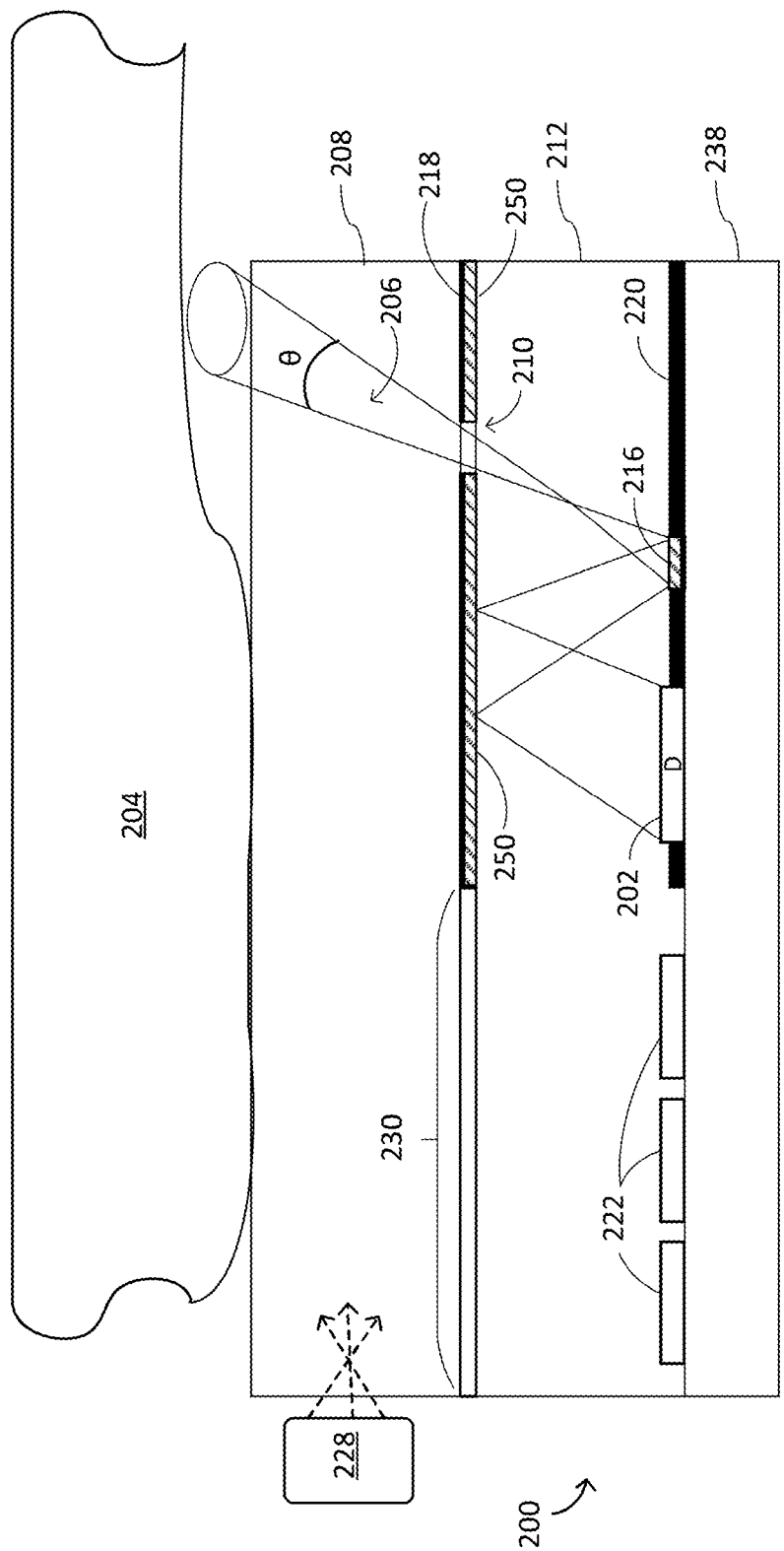
Figure 2C:
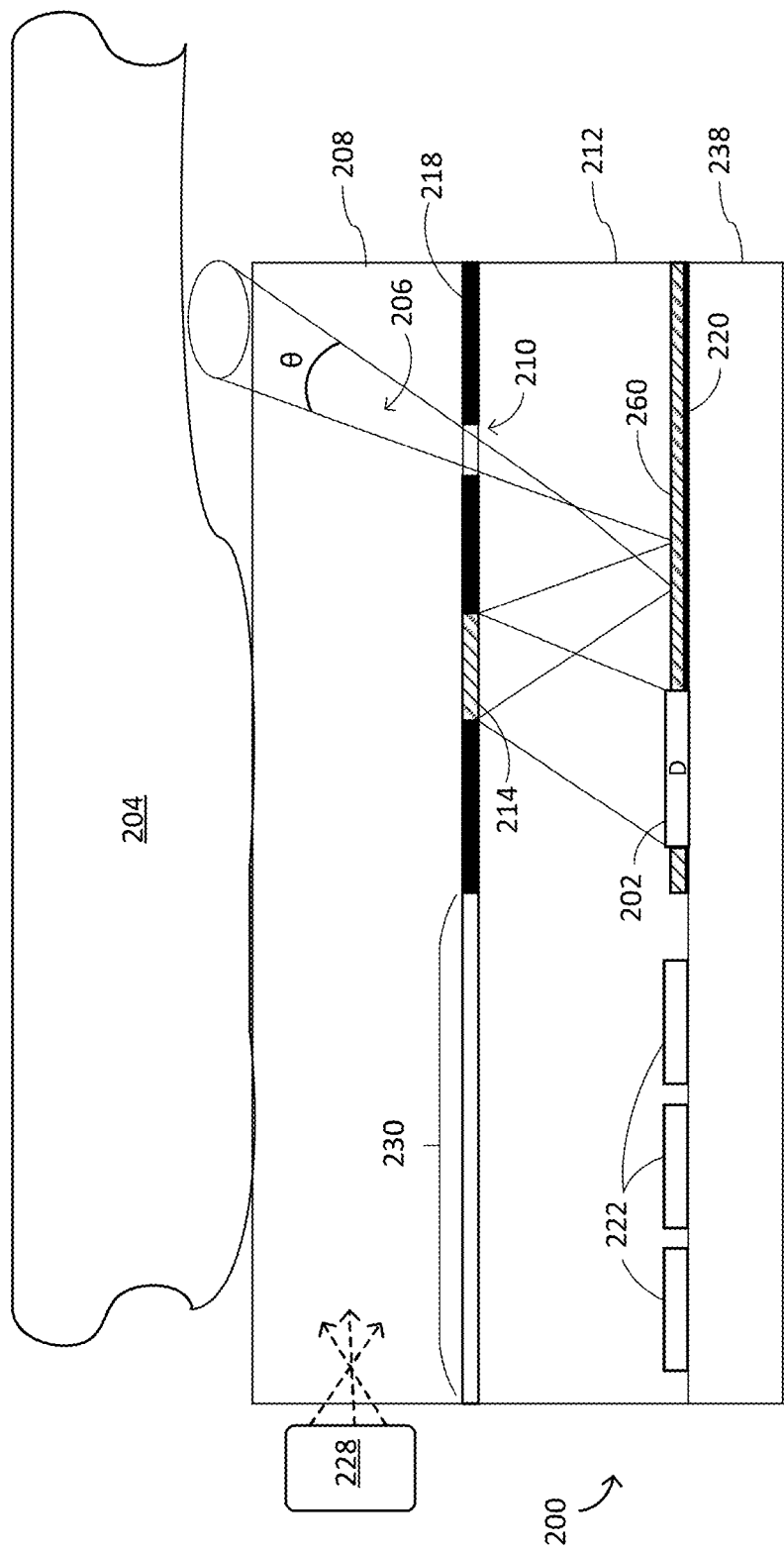

In the examples shown in FIGS. 2A-2C, the detector elements 202 and the display pixels 222 are positioned above a substrate 238. The detector elements 202 may be formed in the same plane as a display backplane for the pixels 222 using a thin film semiconductor fabrication process. Alternatively, the detector elements 202 may be positioned in a different plane from the display pixels 222, or the detector elements may be embodied in a discrete sensor arrangement that is separate from any display stack.

The detector elements 202 are any suitable type of photo detector, which are configured to detect light from above. Examples of suitable detector elements are complementary metal oxide semiconductor (CMOS) and charge coupled device (CCD) sensor arrays. The detector elements 202 may be constructed as thin film photodetectors, such as thin film transistors (TFTs) and/or thin film photo diodes (e.g., pn and pin diodes). The display pixels or sub-pixels 222 may include any type of light source used in typical displays such as light emitting diodes (LEDs), organic LEDs (OLEDs), liquid crystal display (LCD), and the like. The display pixels or sub-pixels 222 may also be constructed as TFTs. In certain embodiments, each of the display pixels or sub-pixels 222 may be a display sub-pixel (e.g., red, green, blue) or may be an element of a pixel, such as a TFT. Although the display pixels or sub-pixels 222 are shown in a single plane, it will be understood that a display pixel may occupy multiple planes such as, for example, in the case of an LCD which may include TFTs, liquid crystals, polarizers, color filters and the like.

In certain embodiments, the display pixels or sub-pixels 222 form a source of light, used to transmit light to the sensing surface 224, which is then reflected and detected by the detector elements 202 as described further below. However, it will be understood that a separate light source, such as light source 228 may be used in place of, or in combination with, the display pixels or sub-pixels 222 to provide the source of light. As yet another example, a LCD backlight may be used as the light source.

The blocking layer 218 defines the first set of apertures 210. The first set of apertures 210 are configured to permit the transmission of certain light reflected off of the sensing surface into the transparent layer 212. The blocking layer 204 may include light absorbing material, reflecting material and/or other material that occludes light from passing through areas other than through apertures 210. Moreover, it will be understood that the blocking layer 210 may not cover all areas of a display. For example, area 230, which is above the display pixels 222, may be transparent to allow light from the display pixels or sub-pixels 222 to be visible to a user. The blocking layer 218 also includes reflective surfaces 214, which may be for example mirrored surfaces, which are positioned to reflect light from below. Although the blocking layer 218 is shown as having discrete reflective surfaces 214, the blocking layer may include a continuous reflective surface 250 as shown in FIG. 2B.

The reflective layer 220 is positioned below the transparent layer 212 and includes reflective surfaces 216. The reflective surfaces 216 are configured to reflect light and may be constructed, for example, as mirrored surfaces. Although the reflective layer 220 is shown as having discrete reflective surfaces 216, it will be understood that the reflective layer may include a continuous reflective surface 260 as shown in FIG. 2C. Non-reflective surface portions of the reflective layer 220 may be made of light absorbing material.

In accordance with the disclosure, the detector elements 202 detect light, which is reflected from the sensing surface 224 and/or the input object 204 and which falls within the acceptance cone 206. Such light is transmitted through the apertures 210 and transparent layer 212, which light is then first reflected off the reflective surfaces 216 and then further reflected reflective surfaces 214 before finally reaching the detector elements 202. Light which falls outside of the acceptance cone 206 is generally prevented from reaching the detector element 202.

For example, some light transmitted into the cover layer 208 (e.g., from the display pixels 222, the separate light source 228, and/or backlight) will become incident on the input object 204 or on the sensing surface 224 below the input object. The incident light will in turn be reflected back towards to the blocking layer 218 at varying intensities. Some of the reflected light will be prevented from passing through the blocking layer 218, e.g., because the light is absorbed or otherwise blocked at layer 218 as shown by light ray 232. However, other reflected light will pass through the first set of apertures 210 and enter into the transparent layer 212, as shown by light rays 234 and 236.

With respect to light entering the transparent layer 212, some of the light may strike the reflective layer 220 without striking a reflective surface 216, which light is simply absorbed by the reflective layer 220 provided the layer is made of a light absorbing material, such as shown by light ray 234. Other light entering the transparent layer 212 will strike one of the reflective surfaces 216 and will be reflected back up towards the blocking layer 218, some of which will strike second reflective surfaces 214. Of the light reflected from the second reflective surfaces 214, some will reach at least one of the detector elements 202, as shown by light ray 236. The amount of light reaching the detector elements 202 is limited by the acceptance cone 206. The size of the acceptance cone 206 is in turn limited by the width of the aperture 210 and the width of one or both of the reflective surfaces 214, 216. The width of the photo detector surface of the detector elements 202 may also serve to limit the acceptance cone.

In accordance with the arrangement described, the direction of light entering a given detector element 202 is restricted to an acceptance cone 206 having a small acceptance angle θ as shown in FIGS. 2A-2C to prevent blurring of the image of the input object 204. The acceptance cone 230 may, for example, be limited to a few degrees. In the example embodiment, acceptance cone 206 corresponds to detector element 202. The acceptance angle θ determines the degree of image blurring and the maximum distance from the detector elements 202 that the input object 204 can be located while still achieving a given image resolution. As noted, the size of the acceptance cones 206 is dependent upon (a) the width of the first aperture 210, (b) width of the reflective surface 216, (c) width of the reflective surface 214, (d) and/or width of the photo detector surface of the detector elements 202. In various embodiments, any two or more of (a)-(d) may have their widths adjusted to limit the acceptance angle θ.

For purposes of illustration, only one detector element 202 is shown having corresponding aperture 210 and reflective surfaces 214, 216 defining acceptance cone 206. It will be appreciated that the sensor will have as many such detector elements 202 as needed to image a desired area of the input object 204 and each detector element 202 will have corresponding aperture(s) and reflective surface(s) to define a different acceptance cone. Further, in the example, one detector element 202 is shown for a set of display pixels or sub-pixels 222 of the display. However, the detector element pitch need not match the display pixel pitch, i.e. each pixel or set of sub-pixels need not have a corresponding detector element. Moreover, detector elements may be staggered in arrangement throughout the display to minimize the reception of stray light.

The arrangement shown in FIG. 2A illustrates an example of an embodiment where the layer above the transparent layer 212 (blocking layer 218) and the layer below the transparent layer 212 (reflective layer 220) have discrete reflective surfaces 214, 216. It will be appreciated that other configurations of reflective surfaces are possible. For example, FIG. 2B illustrates an embodiment where the top layer, i.e. blocking layer 218 includes a continuous reflective surface 250, while the bottom reflective layer 220 includes discrete reflective surfaces 216. In this embodiment, the size of the acceptance cone may be determined from width of aperture 210, the width of reflective surface 216, and/or the size of the detector elements 202. FIG. 2C illustrates another embodiment where the top layer, i.e. blocking layer 218 includes discrete reflective surfaces 214, while the bottom reflective layer 220 includes a continuous reflective surface 260. In this embodiment, the size of the acceptance cone may be determined from width of aperture 210, the width of reflective surface 214, and/or the size of the detector elements 202.

Figure 3:
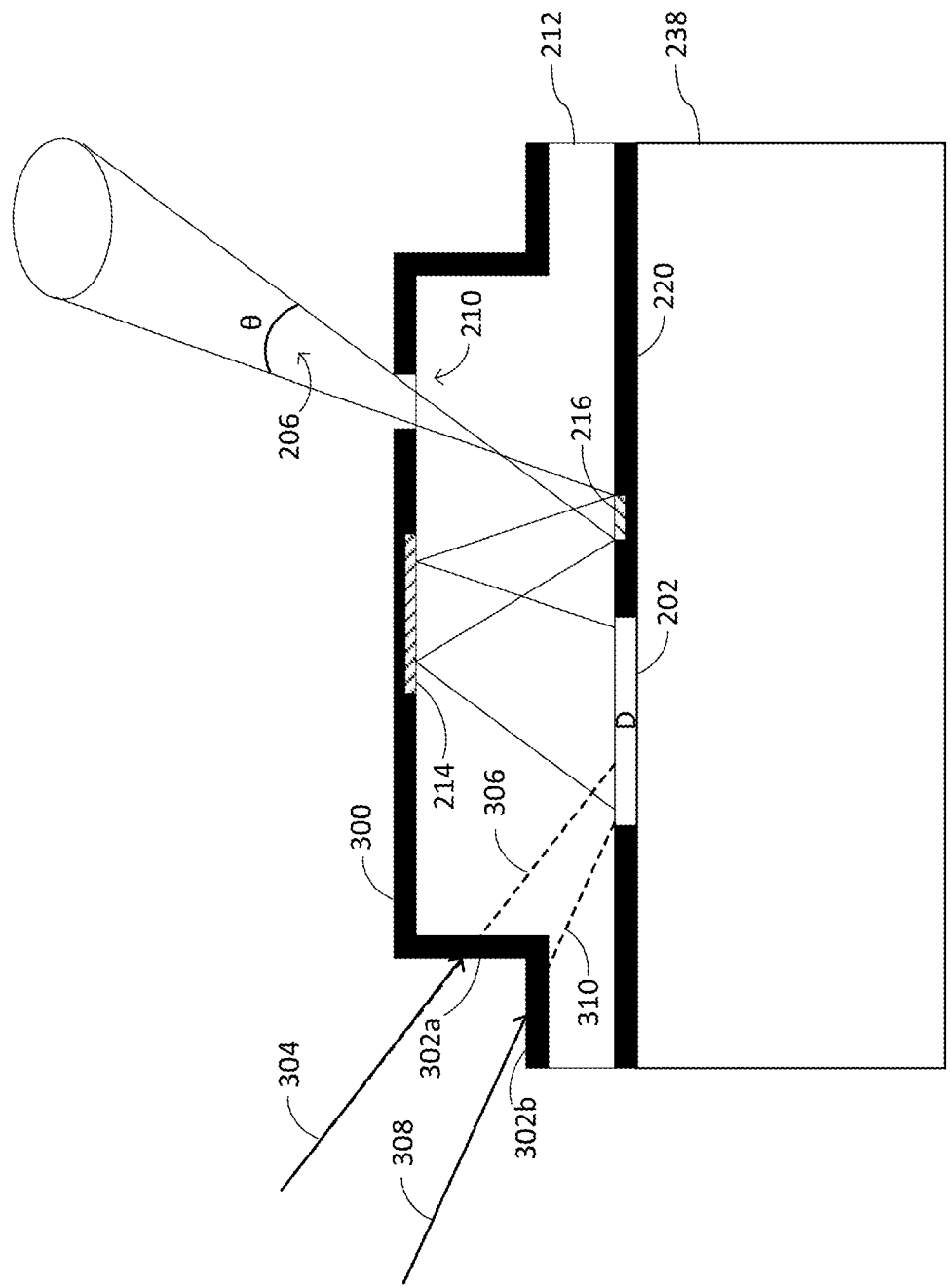
FIG. 3 illustrates an example of a sensor with a light blocking layer, according to an embodiment.

FIG. 3 illustrates a side view of an embodiment have a blocking layer 300 configured to further limit stray light (e.g., light which does not come from within the acceptance cone 206) from reaching the detector elements 202. Similar to FIGS. 2A-2B, the example includes the reflective layer 220 below transparent layer 212. The reflective layer 220 includes reflective surface 216 and detector element 202. Top blocking surface 300 defines aperture 210 and includes second reflective surface 214. Acceptance cone 206 illustrates the path of light which is intended to reach the detector element 202.

In addition to top blocking surface 300, the arrangement also includes stepped blocking portions labeled 302a, 302b. In the example, blocking portion 302a runs above and substantially perpendicular to the plane of the detector elements 202. Blocking portion 302b runs above and substantially parallel to the plane of the detector elements 202. It will be appreciated that FIG. 3 illustrates a cross section and that blocking portions 302a, 302b as well as portion 300 may surround the detector element 202. As shown, the stepped blocking portions 302a and 302b block high angle light (large angle with respect to normal) from reaching the detector element 202. This is illustratively shown by light rays 304 and 308, which fall outside of the desired acceptance cone 206, but which would reach the detector element 202 (from a neighboring aperture, for example) in the absence of the stepped portion 302a and 302b as shown by the projected paths 306 and 310.

Although FIG. 3 has been described using stepped portion 302a and 302b, it will be understood that other configures may be used. By way of example, portion 302b may eliminated. Such configuration would still block stray light rays having paths shown by light ray 304 while allowing light ray 308 to potentially reach the detector element 202. Alternatively, the top blocking surface 300 may extend far enough laterally that stray light rays 304 and 308 are blocked from reaching the detector element 202.

As yet another alternative, blocking portion 302a could extend from blocking portion 300 all the way or substantially the way down to the reflective layer 220. Moreover, the example in FIG. 3 shows walls 302a and 302b running perpendicular and parallel, respectively, to the plane of the detector element. However, other orientations are possible. For example, a slanted and/or curved sidewall could also be used. As in the case of the example shown in FIG. 2A, the sidewalls may also be eliminated.

FIGS. 4A-4B illustrate examples of a reflective layer 400 that may be used in embodiments to reduce the noise caused by stray light arriving at the detector element. The acceptance angle θ of an acceptance cone 402 corresponding to a reflective surface 404 can be constricted by forming a reflective layer 400 having a reflective surface 404 (e.g., mirror) below a top surface 408 of a light absorbing layer 406. The reflective layer 400 only reflects the light that passes within the acceptance cone 402. The light acceptance cone 402 (and hence light acceptance angle θ) can be adjusted by controlling the position of the reflective surface 404 with respect to the top surface 408 of the absorbing layer 406 of the light reflective layer 400.

As shown, the light absorbing layer 406 can be coated directly on top of the reflective surface 404 as shown in FIG. 4A. Alternatively, the light absorbing layer 406 can be coated over a transparent layer 410, which covers the surface of the mirror 404 as shown in FIG. 4B.

The reflective surfaces 400 will reflect light, such as light ray 412, from within the acceptance cone 402 back up towards the blocking layer (not shown). However, light reaching the mirror from angles falling outside of the acceptance cone 402, such as light rays 414, are blocked by the light absorbing layer 406.

Figure 4C:
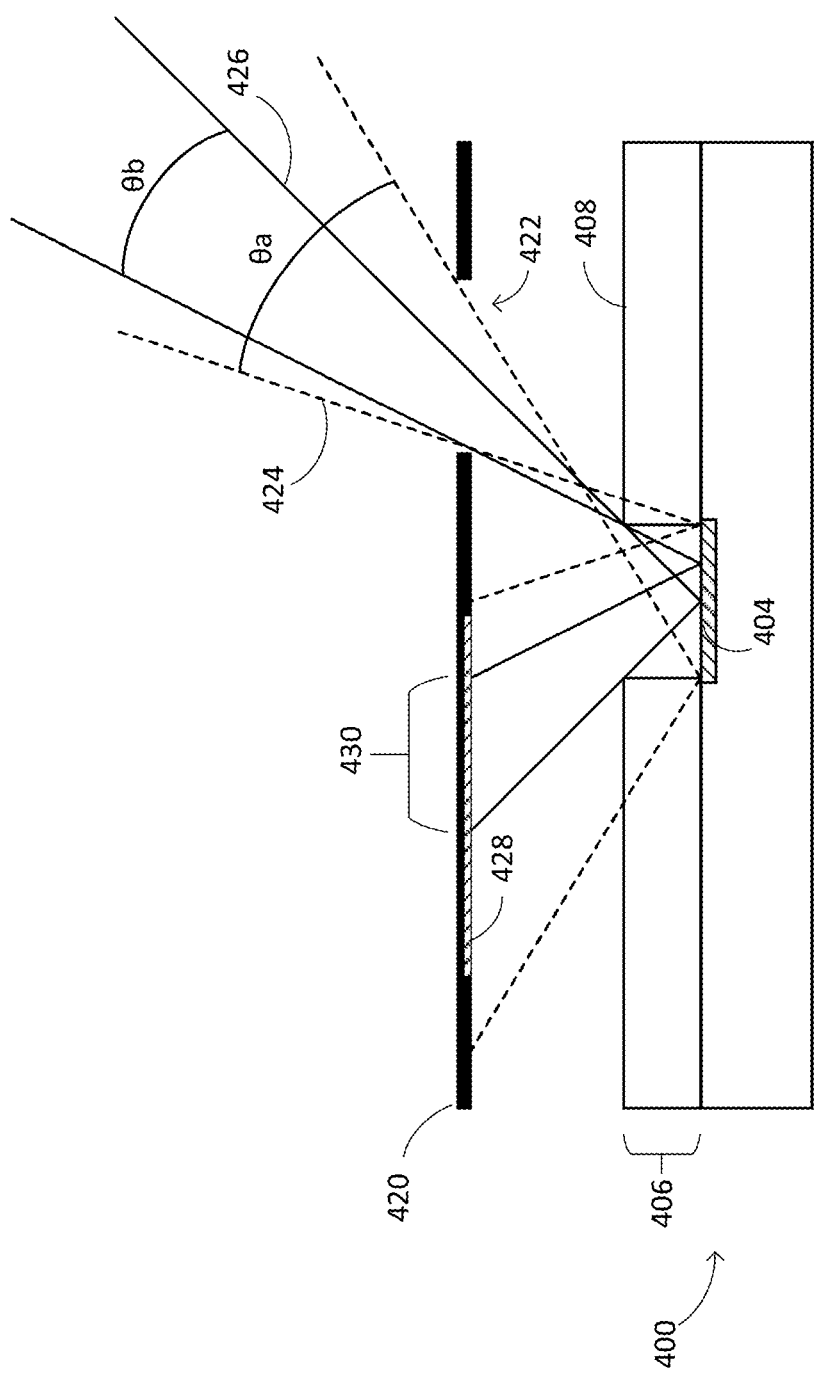

FIG. 4C illustrates an example of the how the reflective surface 400 described in connection with FIGS. 4A-4B may be used to control the light acceptance cone/angle when used in combination with a blocking layer 420 having apertures 422. Shown are the reflective surface 404 recessed below the surface 408 of the light absorbing layer 406. Also shown are blocking layer 420 with aperture 422 and reflective surface 428.

Cone 424 (bounded by dashed lines) represents an acceptance cone having a light acceptance angle θa which results from a width of the reflective surface 404 and a width of the aperture 422. In the case of cone 424, the blocking layer 406 having raised surface 408 relative to reflective surface 404 is ignored. Put another way, for cone 424, it assumed that the surface of the reflective surface 404 and surface 408 are at the same level. As can be seen, an area of an underside of the blocking layer 406 which intersects the acceptance cone 424 is relatively large. In the particular example shown, light from within cone 424 may reach any portion of the reflective surface 428.

Cone 426 (bounded by solid lines) represents an acceptance cone having a light acceptance angle θb. In the case of cone 426, the blocking layer 406 having raised surface 408 relative to the reflective surface 404 is taken into consideration. As can be seen, the area of the underside of the blocking layer 406 which intersects the acceptance cone 426 is relatively narrow compared to cone 424. In the particular example shown, light from within cone 426 may only reach a portion 430 of the reflective surface 428. As previously described, the light reaching reflective surface 428 will be further reflected towards the plane of the detector elements. However, only light within the cone 426 will reach the reflective surface 428. Thus, the reflective surface 400 can be used to control the angle of the acceptance of light which may reach the detector elements.

Figure 5A:
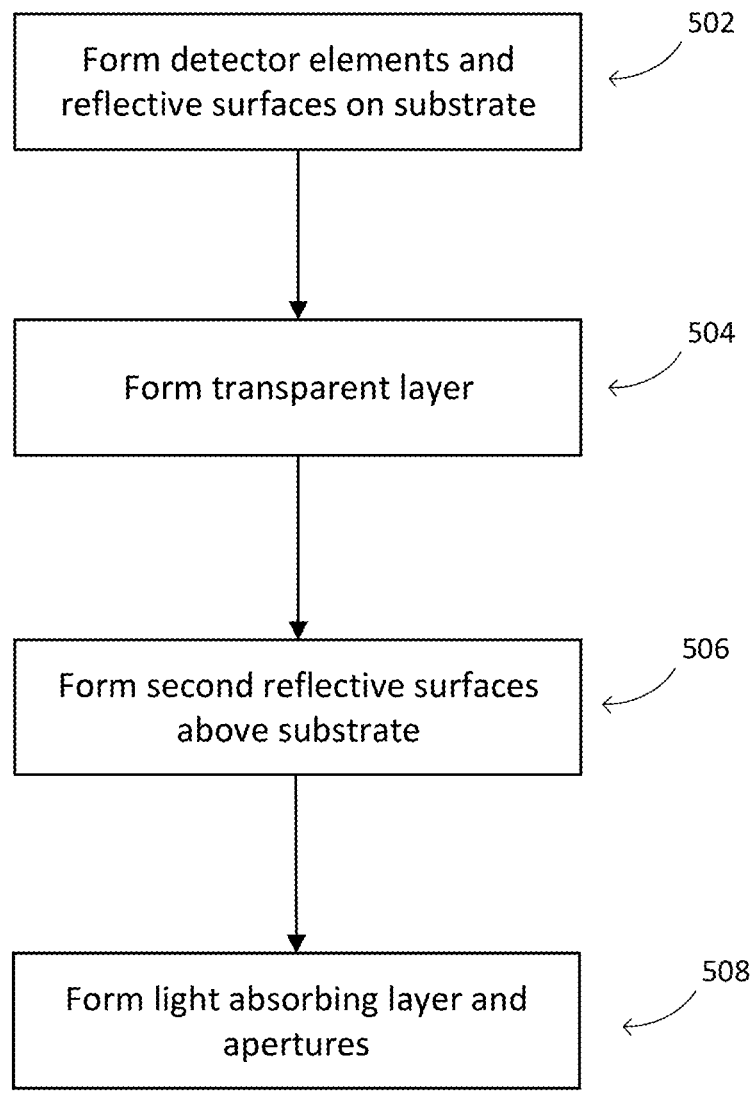
FIG. 5A-5B illustrate a method of making and an arrangement of a sensor stack, according to different embodiments.
Figure 5B:
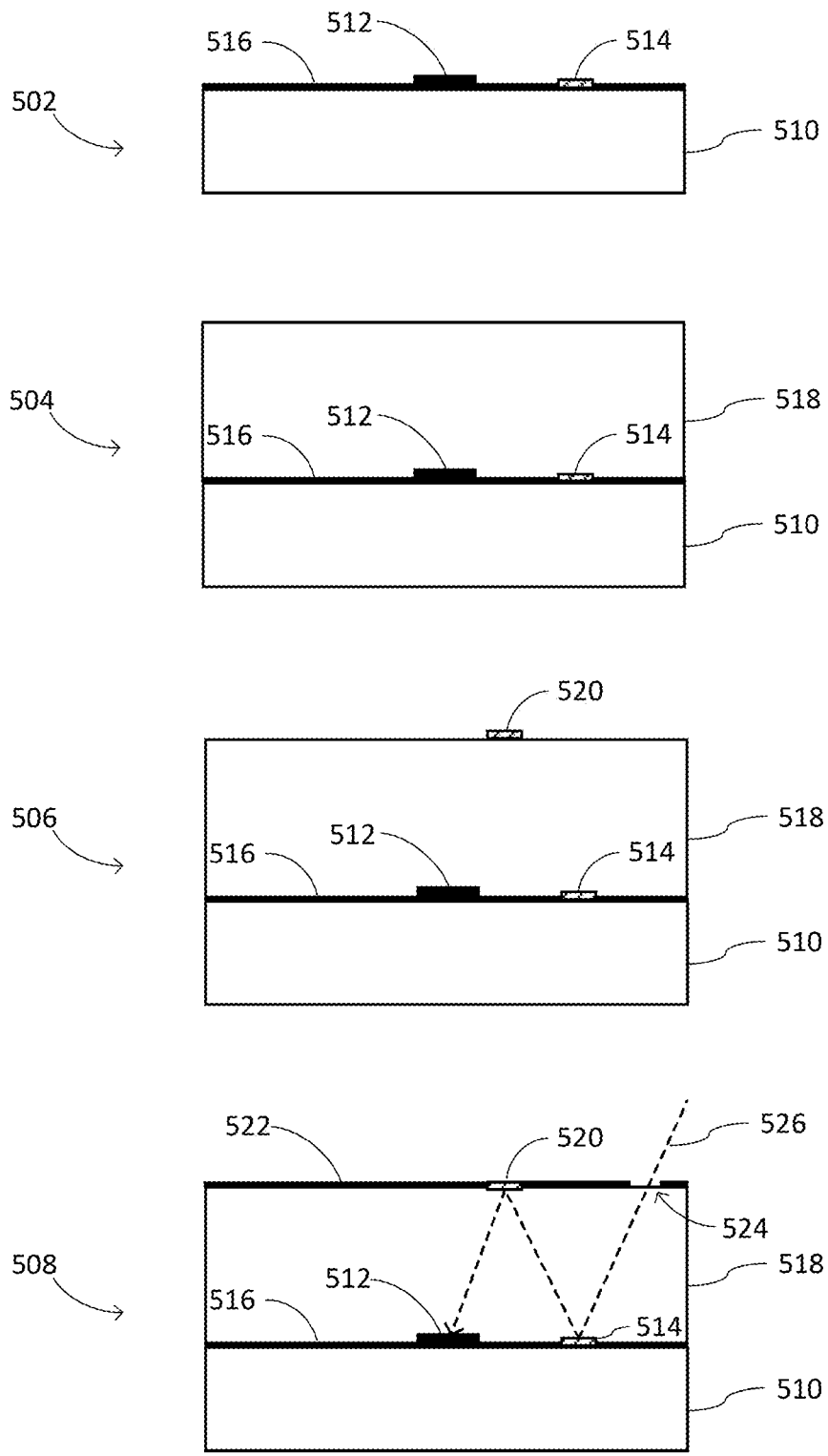

FIGS. 5A-5B illustrate an example of a sensor arrangement including detector elements, a transparent layer, a blocking layer and apertures which may be employed according to the disclosure along with illustrative steps for making and assembling. Although the steps are described in a particular sequence, the sequence may be altered and/or steps may be combined or eliminated without departing from the scope of the disclosure except where otherwise apparent.

In step 502, detector elements 512 and reflective surfaces 514 are formed on a substrate 510. The detector elements 512 may be formed using a thin film semiconductor fabrication process. The reflective surfaces 514 may form discrete mirrored surfaces on the substrate 514 or may form a continuous reflective surface. The substrate 510 may also be optionally coated with a light absorbing material 516 with openings over the reflective surfaces 514. As will be appreciated, the absorbing layer 516 may be fabricated before adding the detector elements 512 or vice versa. As described in connection with FIGS. 4A-4C, the reflective surfaces 514 may be recessed relative to the top of the light absorbing material 516.

In step 504, a transparent layer 518 is formed over the substrate 510. Alternatively, the substrate 510 described in step 502 may be eliminated and the reflective surfaces 514, detector elements 512, and optionally absorbing layer 516 may be formed directly affixed to the bottom of a transparent layer 518. In forming the transparent layer 518, a light absorbing material may also be selectively included with the transparent layer to form sidewalls of a blocking layer, e.g., sidewalls 302a and/or 302b described in connection with FIG. 3.

In step 506, reflective surfaces 520 are placed over the transparent layer. As noted in connection with FIGS. 2A-2B, the reflective surfaces 520 may be discrete reflective surfaces or may be a continuous reflective surface.

As shown in step 508, a light absorbing material 522 may also be coated over the transparent layer 518 and reflective surfaces 520. Apertures 524 are formed in the light absorbing material 522, or alternatively in a continuous reflective surface. To form a blocking layer, such as the blocking layer 300 shown in FIG. 3, a portion of the transparent layer can be etched either partially or completely before the formation of the light absorptive layer. As previously described, a combination of width of the aperture 524, width of reflective surface 514, width of reflective surface 520, and/or width photo sensitive surface of the detector element 202 define a light acceptance cone, which permits certain light such as light ray 526 to reach the detector elements 512.

In illustrating the various embodiments, examples have been shown where the pitch size of the detector elements is generally the same as the pitch size of the display elements. However, it will be understood that the pitch of the detector elements and display elements may be different. In addition, it will be understood that the arrangement of apertures and/or detector pixels may be staggered throughout a display to the further reduce the possibility of noise reaching the detector elements. Detector elements that are susceptible to receiving stray light or noise may be eliminated or simply not used during the imaging process.

It will further be understood that arrangement has generally been described in the context of a sensor for imaging an object. However, the sensor described herein can also be used as a touch sensor.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosure (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A sensor assembly for integration in a display, comprising:
   a substrate having a top surface and a bottom surface;
   a plurality of display pixels;
   a plurality of first reflective surfaces; and
   a plurality of optical detector elements;
   wherein the plurality of display pixels, the plurality of first reflective surfaces; and
   the plurality of optical detector elements are arranged in a single layer on the top surface of the substrate.

2. The sensor assembly of claim 1, further comprising a transparent layer disposed above the substrate.

3. The sensor assembly of claim 2, further comprising a plurality of second reflective surfaces above the transparent layer.

4. The sensor assembly of claim 3, further comprising a blocking layer above the transparent layer; wherein the blocking layer is a light absorbing material forming a plurality of apertures.

5. The sensor assembly of claim 1, further comprising a blocking layer having first portions above and parallel to a plane of the optical detector elements and second portions in an area that at least partially surrounds the optical detector elements.

6. The sensor assembly of claim 5, wherein the second portions are in a plane substantially perpendicular to the plane of the optical detector elements.

7. The sensor assembly of claim 1, wherein the plurality of first reflective surfaces comprise mirrored surfaces.

8. The sensor assembly of claim 1, wherein the first reflective surfaces are surrounded by a light absorbing material.

9. The sensor assembly of claim 8, wherein the first reflective surfaces are recessed relative to the light absorbing material.

10. A method for making an optical sensor assembly for integration in a display, comprising:
    forming a substrate;
    forming a plurality of optical detector elements on the substrate;
    forming a plurality of reflective surfaces on the substrate; and
    forming a plurality of display pixels on the substrate,
    wherein the plurality of display pixels, the plurality of first reflective surfaces, and the plurality of optical detector elements are arranged in a single layer on the substrate.

11. The method of claim 10, further comprising:
    forming a transparent layer above the plurality of optical detector elements and the plurality of reflective surfaces;
    forming a second plurality of reflective surfaces above the transparent layer; and
    forming a light blocking layer above the transparent layer, the light blocking layer having a plurality of apertures.

12. The method of claim 11, further comprising:
    removing portions of a bottom of the transparent layer to form etched portions and forming a light absorbing layer in the etched portions.

13. The method of claim 10, further comprising:
    coating the substrate with a light absorbing layer having openings over the plurality of optical detector elements, the plurality of display pixels, and at least portions of the plurality of reflective surfaces.

14. The method of claim 10, further comprising:
    coating the substrate with a light absorbing layer before forming the plurality of optical detector elements, the plurality of reflective surfaces, and the plurality of display pixels on the substrate.

15. The method of claim 10, wherein forming the plurality of reflective surfaces comprises:
    forming a continuous mirrored surface; and
    selectively disposing a light absorbing material on the continuous mirrored surface to form the plurality of reflective surfaces.

16. A display including a sensor for imaging a biometric input object, comprising:
    a plurality of display pixels;
    a transparent layer;
    a plurality of mirrors positioned above the transparent layer;
    a reflective layer positioned below the transparent layer configured to receive light transmitted through a set of apertures and to reflect the light towards at least one of the plurality of mirrors; and
    a plurality of detector elements positioned below the transparent layer and configured to detect the light.

17. The display of claim 16, wherein the plurality of detector elements are thin film photodetectors.

18. The display of claim 16, wherein at least two widths of the following are adjusted to limit an acceptance angle of light: (a) a width of apertures in the set of apertures, (b) a width of the plurality of mirrors, (c) a width of reflective surfaces in the reflective layer, and (d) a width of surfaces of the detector elements.

19. The display of claim 16 wherein the reflective layer comprises mirrored surfaces surrounded by light absorbing material.

20. The display of claim 16, further comprising:
    a blocking layer, wherein the blocking layer includes first portions above and parallel to a plane of the plurality of detector elements and second portions in an area that at least partially surrounds the plurality of detector elements, wherein the second portions are in a plane substantially perpendicular to the plane of the plurality of detector elements.

* * * * *